(12) United States Patent
Nada

(10) Patent No.: US 6,571,025 B2
(45) Date of Patent: *May 27, 2003

(54) HANDHELD CODE READER WITH OPTIMAL OPTICAL READING DISTANCE

(75) Inventor: Yoshiyuki Nada, Hachioji (JP)

(73) Assignee: Olympus Optical Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/311,491

(22) Filed: May 13, 1999

(65) Prior Publication Data
US 2003/0039411 A1 Feb. 27, 2003

(30) Foreign Application Priority Data
May 18, 1998 (JP) .......................... 10-135170
May 27, 1998 (JP) .......................... 10-145234

(51) Int. Cl.⁷ .................................. G06K 9/22
(52) U.S. Cl. ...................... 382/314; 235/494
(58) Field of Search ................. 382/255, 274, 382/312–314, 321, 324; 358/470, 474, 478, 482, 483; 235/435, 454, 462.01, 462.11, 462.32, 462.45, 462.49, 494

(56) References Cited

U.S. PATENT DOCUMENTS

| | | | | |
|---|---|---|---|---|
| 5,416,312 A | * | 5/1995 | Lamoure | 235/494 |
| 5,646,390 A | * | 7/1997 | Wang et al. | 235/454 |
| 5,686,720 A | * | 11/1997 | Tullis | 250/208.1 |
| 5,724,364 A | * | 3/1998 | Mori et al. | 714/709 |
| 5,777,314 A | * | 7/1998 | Roustaei | 235/462.42 |
| 5,894,119 A | * | 4/1999 | Tognazzini | 235/462.15 |
| 5,896,403 A | | 4/1999 | Nagasaki et al. | 371/37.1 |

FOREIGN PATENT DOCUMENTS

EP 0670 555 A1 9/1995 ............ G06K/1/12

* cited by examiner

Primary Examiner—Timothy M. Johnson
(74) Attorney, Agent, or Firm—Frishauf, Holtz, Goodman & Chick, P.C.

(57) ABSTRACT

In the optical system of a code reader, its MTF best position on the subject side at a spatial frequency corresponding to a code pattern is set to be present at a given distance from the end surface of the code reader. The light receiving surface of a photosensor is set larger than the image of one block of the code pattern which is formed through the optical system.

6 Claims, 8 Drawing Sheets

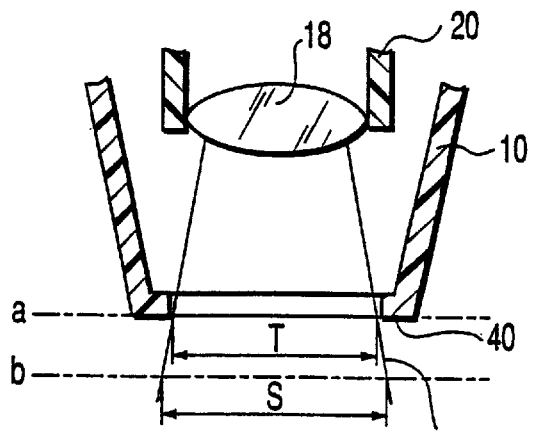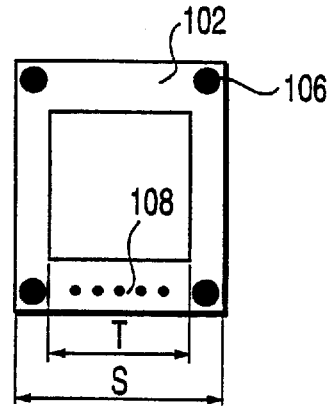
FIG. 5  FIG. 6
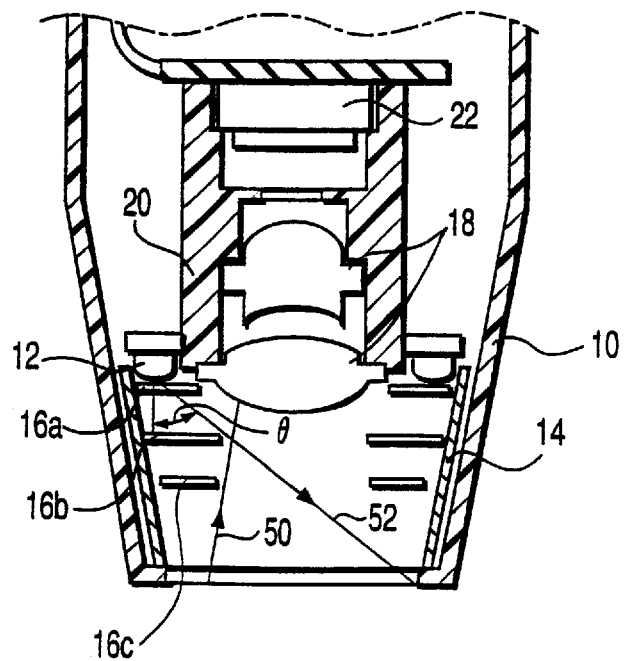
FIG. 7

HANDHELD CODE READER WITH OPTIMAL OPTICAL READING DISTANCE

BACKGROUND OF THE INVENTION

The present invention relates to a code reader adapted to read a one- or two-dimensional code pattern that is optically readably recorded or printed on a sheet-like recording medium such as paper.

More specifically, the present invention relates to optimization of the focusing state of the optical system in the code reader.

Conventionally, there have been a number of proposals for code readers, which are adapted to read a one- or two-dimensional code pattern, including a bar code, that is optically readably printed or recorded on a sheet-like recording medium such as paper.

Those code readers include a photosensor containing a line sensor or area sensor for converting outgoing light from the optical system into an electric signal and optically read a code pattern optically readably printed on a sheet-like recording medium. Also, a type of code reader has been proposed which optically reads the code pattern by manually scanning it with contact made with the recording medium.

A proposal has also been made by the assignee of this invention for a dot code which is a code pattern for printing multimedia information containing sound, video, text, and so on in an optically readable form onto a sheet-like recording medium and a code reader for optically reading that dot code (see published European application EP 0067555 A1, which corresponds to U.S. Ser. No. 08/407,018, now U.S. Pat. No. 5,896,403).

FIG. 18 shows the physical format of the code pattern disclosed in the aforementioned European application.

A dot code 100 is arranged in the form of a two-dimensional array of blocks 102. Each block is composed of a data dot pattern section 104, markers 106, and a block address pattern 108.

The data dot pattern section 104 contain a corresponding one of blocks of data into which, for example, sound information is divided. In the data dot pattern section 104 of each block, data are present as a dot pattern composed of white dots or black dots corresponding to 0 or 1 values of data. Note that grid lines shown in FIG. 18 are virtual lines.

The markers 106 are placed at four corners of each block and each comprised of a fixed number of contiguous black dots. These markers are used to find reference points for detecting data dots 110 in the data dot pattern section 104.

The block address pattern 108 is placed between the markers 106 so as to allow the identification of the corresponding one of the blocks 102. The block address pattern contains an error detecting or correcting code.

According to such a physical format of the dot code, even if the size of reflected light from the dot code at the light receiving surface of a solid-state image pickup device, such as a CCD, that is the photosensor of the code reader is larger than that of the light receiving surface, in other words, even if the entire dot code cannot be captured in one shot by the solid-state image pickup device, original data can be reconstructed from data of each block by capturing at least one block in one shot and reading its address, that is, by capturing the entire dot code in two or more shots.

Therefore, such a dot code system allows the storage of large amounts of data on a medium, such as paper, which is not feasible with conventionally known one- or two-dimensional code patterns and is expected to find various applications hitherto unexpected, such as the transfer of multimedia information through paper.

Since the code reader is operated manually to scan through a recording medium while contacting the medium, its end surface 112 may be tilted with respect to a recording medium 114 as shown in FIG. 19 or floated over the medium thought not shown. Namely, the end surface 112 of the code reader is not necessarily brought into contact with the recording medium 114 during the manual scanning of the code pattern in its entirety.

The code reader repeats an image capture operation periodically and concatenates image data obtained in a set of image capture operations, thereby allowing the entire code pattern to be read. When the distance between the code reader and the recording medium varies from time to time owing to tilting or floating of the code reader, it becomes difficult to concatenate image data. That is, the occurrence of floating or tilting of the code reader may result in a failure to read the code pattern accurately.

In order to allow accurate manual reading by resolving those problems, there have been an approach to increase the depth of focus by stopping down the lens aperture and an approach to use autofocus systems as used in video cameras and so on.

With the former approach, it is required to replace the light source used with a brighter one because, when the lens aperture is stopped down, the amount of illumination light is correspondingly reduced. This will impose a heavier burden on the illumination system than is necessary. The latter case, while it is possible to provide images of fixed contrast even if the distance to the recording medium varies, results in an increase in the size, complexity, and cost of the device.

BRIEF SUMMARY OF THE INVENTION

It is therefore an object of the present invention to provide a code reader which, without suffering from an increase in cost and size, allows a code pattern to be captured as accurately as possible for preventing read errors even when the code reader has its contact surface tilted relative to or floated over a recording medium in manually scanning the code pattern.

According to an aspect of the present invention, there is provided a code reader which is used with a sheet-like recording medium on which data are recorded as an optically readable code pattern and optically reads the code pattern while being in contact with the recording medium and being manually moved over the code pattern, comprising: an optical system for forming an optical image of the code pattern recorded on the recording medium on a photosensor; and the photosensor for converting the optical image formed by the optical system into an electrical signal, wherein a modulation transfer function (MTF) best position on a subject-side of the optical system at a spatial frequency corresponding to the code pattern is set to be present at a given distance from the surface of the code reader with the recording medium.

Here, the MTF in an optical system is the ratio of image contrast to object contrast at a certain spatial frequency. In other words, the MTF best position can also be the to be the position in which the image contrast becomes maximum, or the position in which the image is best focused.

That is, the code reader according to this aspect of the present invention is characterized in that, when the code pattern is present in the position which is at a given distance from the code reader surface of contact with the recording medium, the image of the code pattern formed on the photosensor becomes maximum in contrast.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 shows the optical system and the field of view of the code readers of the first and second embodiments;

FIG. 6 shows the field of view of the code readers of the first and second embodiments for a code pattern;

FIG. 7 is a sectional view of the principal part of an image reader according to a third embodiment of the present invention;

DETAILED DESCRIPTION OF THE INVENTION

First Embodiment

Figure 1:
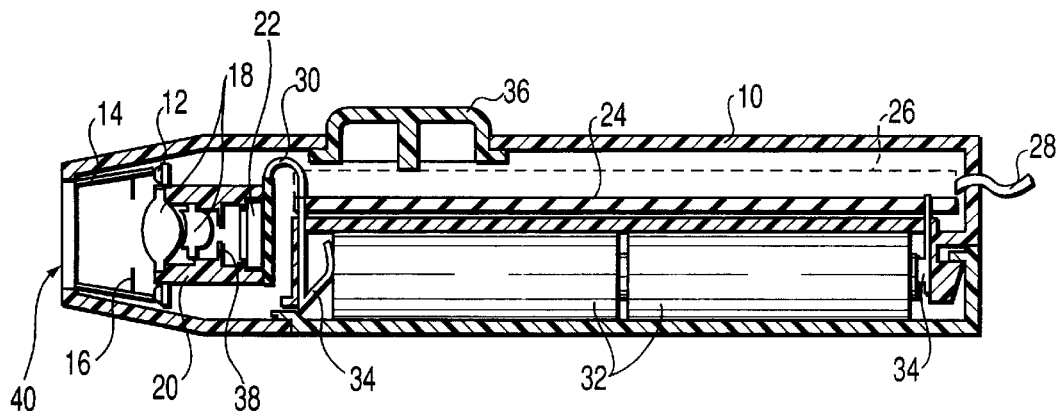
FIG. 1 shows an arrangement of a code reader according to a first embodiment of the present invention.

Referring now to FIG. 1, there is illustrated in sectional view a code reader according to a first embodiment of the present invention, which is formed in the shape of a pen and comprises an illumination section, an imaging optical section, a processing circuit section, and an outer package 10.

The illumination section, which is adapted to illuminate a code pattern printed on a recording medium, includes light sources 12 such as LEDs, a reflector member 14 consisting of a bright aluminum plate, and a diffusion member 16 consisting of a white sheet.

The imaging optical section comprises lenses 18 and a lens barrel 20 for holding the lenses. By the imaging optical section, reflected light from the code pattern illuminated by the illumination section is focused onto a photosensor 22 comprising an area sensor such as a CCD.

The processing circuit section comprises a board 24 and electrical equipment 26 mounted on the board. The processing circuit section processes a code pattern image captured by the photosensor 22 to recover the original data and outputs it over a signal cable 28.

Further, in the example of FIG. 1, the code reader is equipped with a cable 30 for connecting the photosensor 22 and the processing circuit section together, batteries 32, battery terminals 34, an operating switch 36 used by a user to instruct the commencement of reading of the code pattern, and a fixed diaphragm 38 integrally incorporated in the lens barrel 20.

The code reader thus arranged is manually moved to read a code pattern recorded on a recording medium with its end surface 40 facing the recording medium, preferably in contact with the recording medium.

Figure 2:
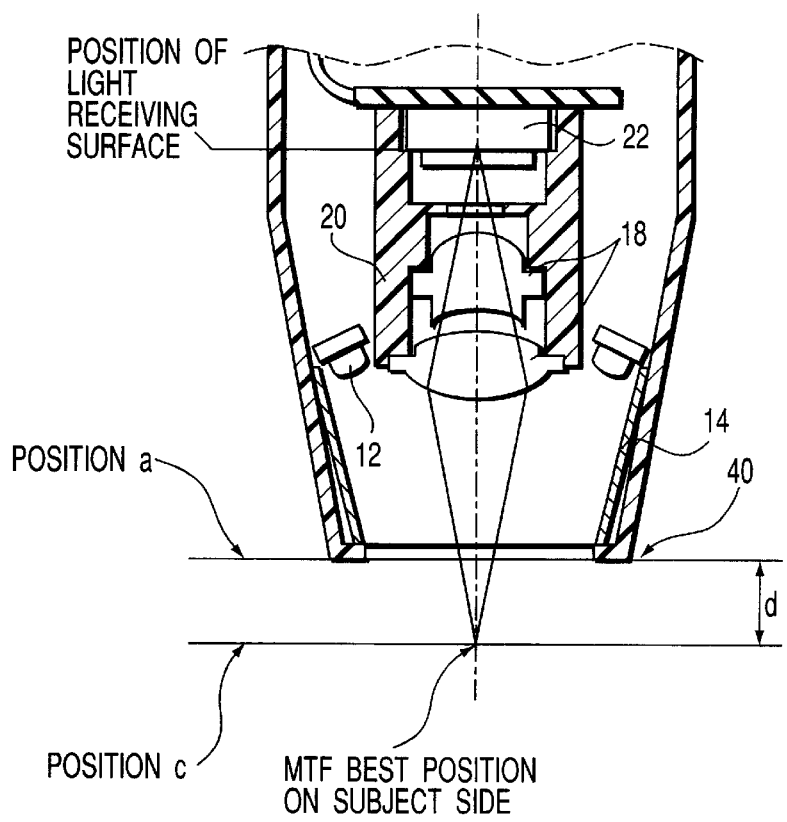
FIG. 2 shows the MTF best position of the optical system of the code reader of FIG. 1.

As shown in FIG. 2, the imaging optical section focuses reflected light from the code pattern onto the photosensor 22.

Changing the distance d to the recording medium leads to variations in image formation state (focusing state) on the photosensor 22. The image formation state of optical systems is generally represented by MTF (Modulation Transfer Function). When the recording medium is positioned in the MTF best position on the subject side of the optical system, the code reader of this embodiment allows an image of the highest contrast to be formed on the photosensor 22. That is, in this state, the image is in focus.

Whether an image is in focus or out of focus can be judged through visual evaluation of resolution based on a chart or measurement of the amplitude of an output signal of an imaging device. In either case, the judgment is too subjective. The MTF refers to image contrast/subject contrast at a certain spatial frequency. Since the contrast can be measured using measurement equipment, the focusing state can be evaluated objectively and absolutely. In the present invention, therefore, it is decided that the focusing state of the optical system be represented by MTF. More specifically, the focusing state is represented in terms of contrast.

In FIG. 2, the position c of the recording medium when the code pattern on the recording medium is precisely imaged onto the light receiving surface of the photosensor 22 by the lenses 18 is the subject-side MTF best position at the spatial frequency corresponding to the code pattern. This embodiment is characterized in that the MTF best position (position c) is at a given distance d from the end surface 40 of the code reader (position a).

In other words, the MTF best position is the point that gives the maximum contrast to the image formed on the photosensor 22 when the code pattern is placed in that position. Further, the MTF best position can also be said to be the point that allows the image to be best focused.

Some of the conventional code readers are arranged such that a code pattern is read with the end surface of the code reader in contact with a recording medium, the read range in the direction of optical axis does not need to be set so wide because the code pattern is read in one shot, and an image of the maximum contrast is formed when, as usually practiced, the recording medium as a subject is placed in the position of the end surface of the code reader, namely, the subject position that allows the subject to be imaged in the best state of focus by the optical system is present at the end surface of the code reader.

Figure 3:
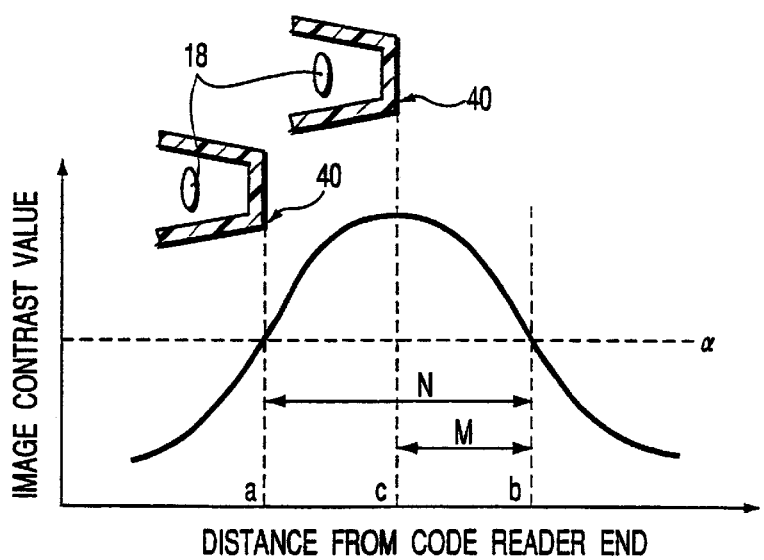
FIG. 3 is a plot of image contrast values versus distance between the end surface of the code reader and a recording medium.

FIG. 3 is a plot of contrast values of an image formed by the lenses 18 as the optical system versus distance to a recording medium along the optical axis of the optical system. The contrast values are shown on the vertical axis and the distance between the recording medium and the code reader end surface is shown on the horizontal axis. Here, when the recording medium is placed at the distance corresponding to the position c, the image contrast value becomes maximum. As shown, as the distance increases or decreases from the distance corresponding to the position c, the contrast value declines.

In FIG. 3, assuming that the contrast values readable by the code reader are α or more, the code reader can read the code pattern over the range from the distance corresponding to the position a to the distance corresponding to the position b.

When the lenses 18, the photosensor 22 and the code reader end surface 40 are positioned so that the end surface is present at the distance of position c, a maximum contrast value will be formed when the code pattern is in contact with the code reader end surface. As can be seen from FIG. 3, in this case the code reader allows the code pattern to be read over the range of position c to position b (range M).

However, the present invention is characterized in that the code reader end surface 40 is positioned at the distance of position a. That is, by allowing that position of the code pattern that maximizes the contrast of its image formed by the optical system to be at a given distance from the code reader surface (the end surface 40) of contact with the recording medium, the reading range (range N) can be obtained which is about twice as large as the range M in the case where the end surface 40 is placed in the position c.

Therefore, the first embodiment of the present invention thus arranged allows extension of the code pattern readable range in the direction of the optical axis of the optical system. That is, compared to the approach to increase the depth of focus by stopping down the lens, the first embodiment does not suffer any loss in amount of illumination light, thus eliminating the need of exchanging the illumination light source for a brighter one. In addition, since there is no need of using a complex mechanism such as an autofocus system, the device does not suffer from an increase in cost and size.

Second Embodiment

Next, a code reader according to a second embodiment of the present invention will be described.

Figure 4:
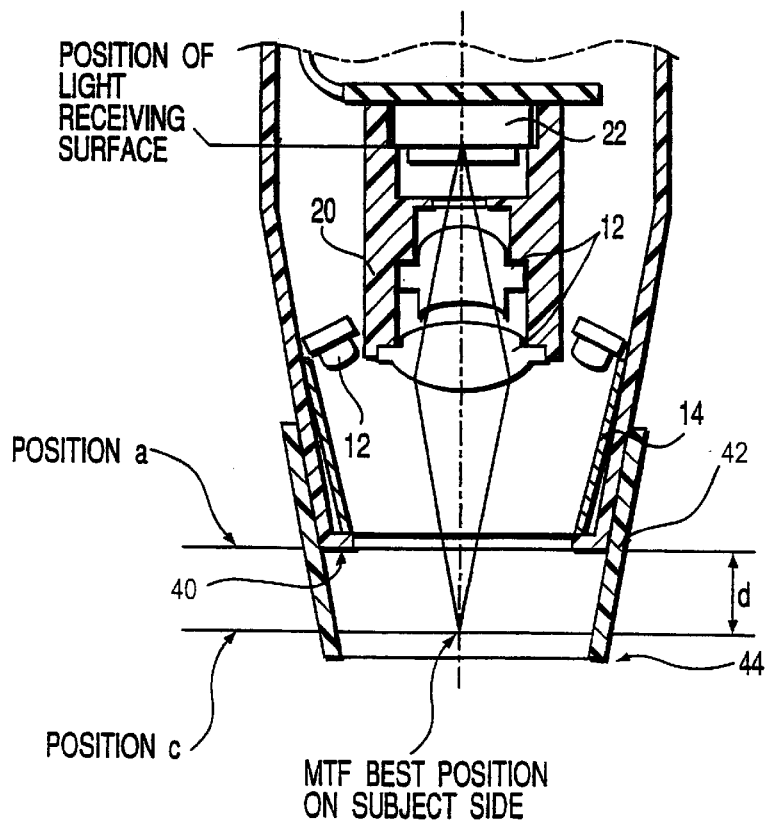
FIG. 4 shows the MTF best position of the optical system of a code reader according to a second embodiment of the present invention.

The code reader according to the second embodiment of the present invention has a hood 42 as shown in FIG. 4. The hood 42 is present on a part or all of the circumference of the end surface 40 of the code reader and slidable along the longitudinal line of the pen-shaped code reader, i.e., in the direction of the optical axis of the optical system.

The hood is coupled to a spring means not shown so as to be pressed downward in FIG. 4. In addition, the hood is coupled to a switch means not shown. The switch means has the same function as the operating switch 36 shown in FIG. 1. When the end of the code reader is pressed against a recording medium by the operator, the hood 42 moves upward in FIG. 4, turning ON the switch means to initiate the image capture operation. When the operator separates the code reader from the recording medium, the hood 42 is pressed downward by the spring means, so that it returns to its initial position.

The code reader of the second embodiment remains unchanged in construction from the code reader of the first embodiment except for its end portion and hence detailed description of its construction is omitted.

In short, according to the code reader of the second embodiment, the operate can commence the image capture operation by pressing the code reader against the recording medium without operating the operating switch.

The switch means coupled with the hood 42 may be of a type which, once depressed, continues to be turned ON even if it is released, that is, even if the code reader is separated from the recording medium and is turned OFF when depressed again or of a type which is turned ON while it is depressed by the hood, that is, as long as the code reader is pressed against the recording medium with a given force.

Accordingly, with the former type, it is essential to set the force of the spring means against the hood 42 somewhat larger than the force with which the code reader is pressed against the recording medium during a normal read scanning operation (at a minimum, the force corresponding to the weight of the code reader). With the latter type, conversely it is essential to set the spring force smaller than the force with which the code reader is pressed against the recording medium during a normal read scanning operation (at a minimum, the force corresponding to the weight of the code reader).

In the second embodiment as well, the code reader is expected to float over or tilt with respect to the recording medium.

By allowing the MTF best position on the subject side at the spatial frequency corresponding to the code pattern to be present at a distance of d from the code reader end surface 40 as is the case with the first embodiment, the second embodiment will provide the same advantages as the first embodiment.

In the second embodiment, the switch means may be of either the above-described former type which, once depressed, keeps turning ON or the latter type which turns ON only while depressed. In the former case, since the image capture operation is continued even if the end of the hood 42 is greatly separated from the recording medium during scanning, it is better to set the distance d to a relatively large value. In the latter case, on the other hand, in order to turn ON the switch, it is required that the hood 42 be pushed by some distance during scanning; thus, the distance d can be set to a relatively small value.

With the former type, therefore, it is desirable that the MTF best position be situated on the outside of the end surface 44 of the hood 42, not to mention on the outside of the code reader end surface 40.

In contrast, with the latter type, during scanning the end surface 44 of the hood 42 becomes substantially flush with the code reader end surface 40; thus, the MTF best position, though being situated at a distance of d from the code reader end surface 40, is required to be situated somewhat inside the end surface 44 of the hood 42 in its initial position. This corresponds to the state shown in FIG. 4.

By constructing the code reader in this manner, when the end surface 44 of the hood 42 is pressed against the recording medium and consequently pushed upward, the MTF best position will be situated in the position where it is most likely that the recording medium is present. Thus, the code pattern can be read stably and accurately irrespective of the occurrence of floating and/or tilting of the code reader.

The hood 42 need not be shaped in such a way that its end surface 44 is perpendicular to the optical axis of the optical system as shown in FIG. 4. For example, the hood end surface may be formed so as to be tilted with respect to the optical axis of the optical system.

In that case, the operator is allowed to operate the code reader while tilting it with respect to the recording medium; thus, the operator can scan the code with a sense of using writing implements, improving operability. Further, since the MTF best position is present at a given distance from the surface of contact with the recording medium, the code pattern can be read stably and accurately irrespective of the occurrence of floating and/or tilting of the code reader.

Next, the imaging field of the code readers of the first and second embodiments will be discussed.

The range of the imaging field of the code readers is defined as follows: When, as shown in FIG. 5, the recording medium is present at a given distance from the code reader end surface 40, that is, when the recording medium is present in the position c shown in FIG. 5, the imaging range S becomes the field of view of the code reader. In contrast, when the recording medium is present in the position a in FIG. 5, that is, when the recording medium is brought into contact with the code reader end surface 40, the code pattern within the range T narrower than the range S is imaged onto the photosensor.

In a block-based code format, such as in a dot code in the code pattern physical format shown in aforementioned published European application EP 0670555 A1, since information is recorded divided into blocks of data, the code reader is permitted to read a large code pattern having a large number of blocks by concatenating blocks of data on the basis of block addresses of the respective blocks. That is, it is essential that the code reader be able to capture at least one block in one shot and recognize its address.

Assume that, when the recording medium is in the positions a and c, the imaging ranges over which the code reader can capture the code pattern are T and S, respectively, as shown in FIG. 6. Then, if the imaging range T when the code pattern is positioned at the end surface 40 (when the recording medium is in the position a) is smaller than the block 102, the code the code reader cannot recognize the block, resulting in failure to read the code pattern.

Figure 18:
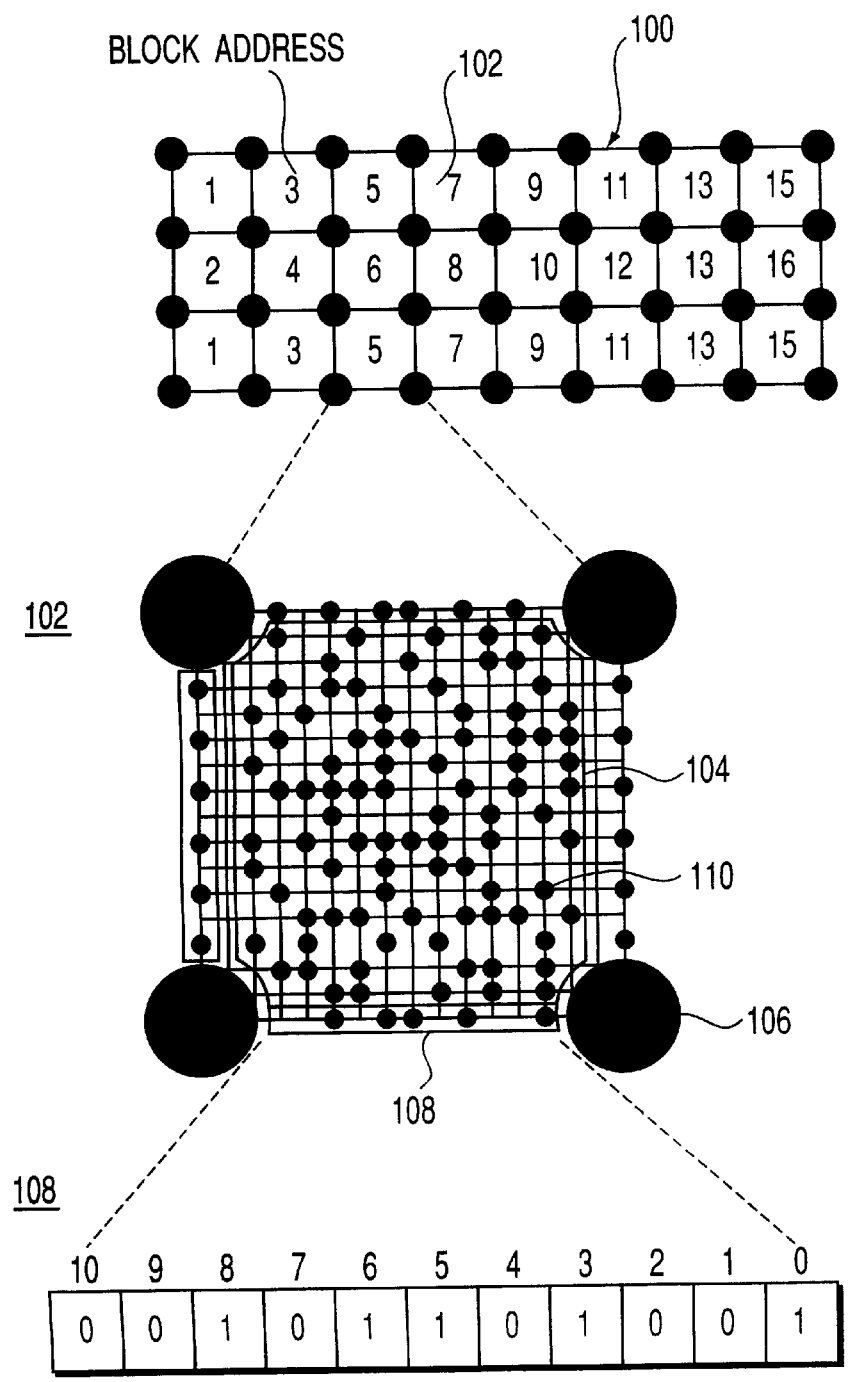
FIG. 18 shows a prior-art dot code.

Thus, this embodiment is configured so as to, when the imaging range T is set for the code pattern shown in FIG. 18, that is, when the code reader end surface 40 is placed in contact with the code pattern, be able to capture at least one block and recognize the block address assigned to each block.

More specifically, when the code pattern is present in the position a shown in FIG. 2, the area of the light receiving surface of the photosensor is set larger than the image of one block formed onto the light receiving surface of the photosensor by the optical system.

Thereby, even if the distance between the code reader end surface and the recording medium varies during manual scanning, the original information can be reconstructed at all times from data in each block.

That is, even if reflected light from the code pattern at the light receiving surface of the solid-state image pickup device, such as CCD, which is the photosensor of the code reader is larger in size than that light receiving surface, namely, even if the dot code cannot be captured in its entirety in one shot, the original information can be reconstructed in its entirety from data in the respective blocks on the basis of their addresses. Thus, the code reader can read the code pattern consisting of an arrangement of two or more blocks. As a result, it becomes possible to store large amounts of data on paper or the like, which could not be implemented with a one- or two-dimensional code pattern hitherto known. That is, it becomes possible to convey easily multimedia information through a medium such as paper.

Third Embodiment

Next, a description will be given of a code reader according to a third embodiment of the present invention.

When the code reader end surface is tilted relative to or floated over the recording medium at the time of manual scanning of the code pattern, irregularities in the brightness may occur in the imaging area due to regular reflection of illumination light emitted by the light sources 12. For this reason, as shown in FIG. 1, the light diffusing member 16 is provided for the purpose of preventing the occurrence of regular reflection on the code pattern by diffusing the light emitted from the light sources 12. The third embodiment is directed to the optimum configuration of the light diffusing member 16.

FIG. 7 shows the optimum configuration of the light diffusing member 16 in the code reader according to the third embodiment of the present invention. The light sources 12 are placed in the shape of a ring around the lens barrel 20 and the light diffusing member 16 is placed in front of the light sources 12. Hereinafter, the workings of the light diffusing member when placed in each of three positions will be described.

Figure 8:
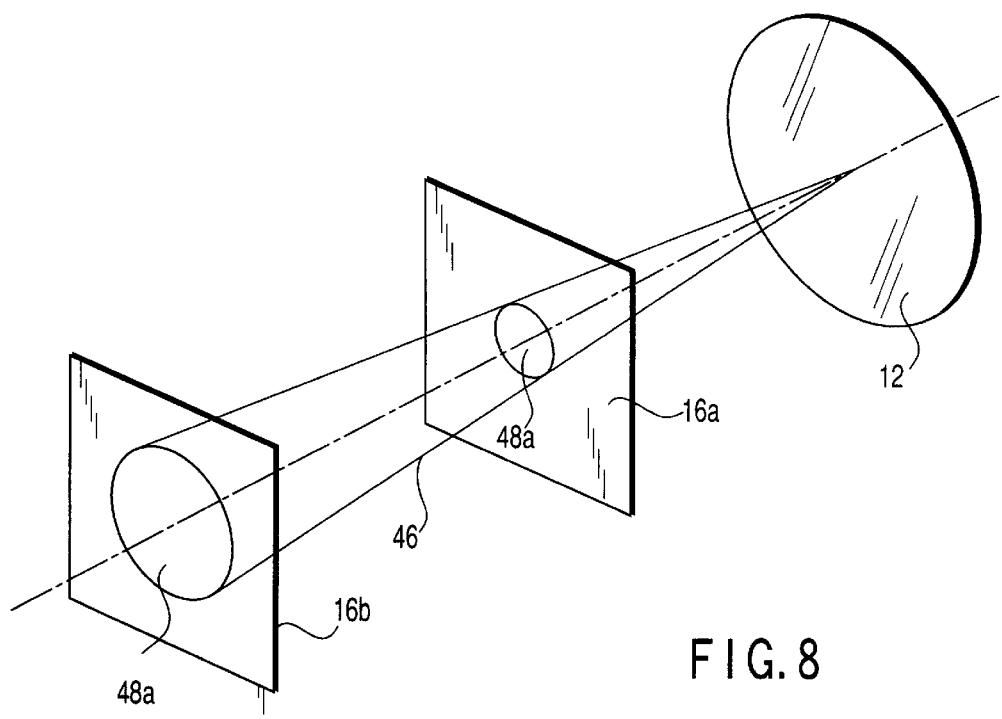
FIG. 8 shows how a beam of light from the light source diffuses.

It is a part of direct light to the subject surface from the light sources 12 that suffers regular reflection. The regular reflection can be prevented by diffusing that light and allowing it to fall on the subject surface at a given angle. An alternative approach is to reduce the intensity of light. When the light diffusing member is placed immediately in front of the light sources 12 as shown at 16a in FIG. 7, there is little effect of diffusion. When the light diffusing member 16a is placed in close proximity of the light sources 12, rays 46 of light from the light source are incident on a region 48a of the light diffusing member 16a as shown in FIG. 8 with the result that the region acts as a secondary light source. For this reason, although the rays of light are diffused by the light diffusing member 16a and the intensity of light suffering regular reflection is thus reduced, there is little effect of diffusion.

Figure 9:
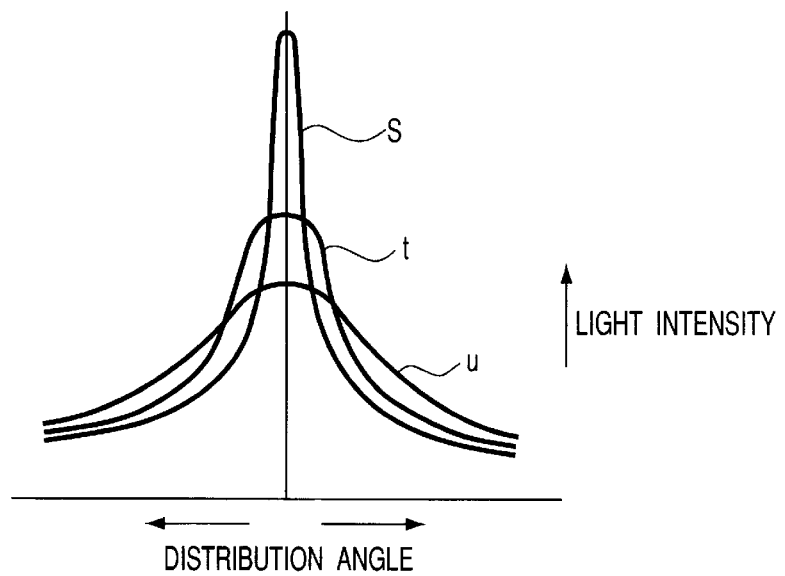
FIG. 9 is a plot of light intensities versus light distribution angle.
Figure 10:
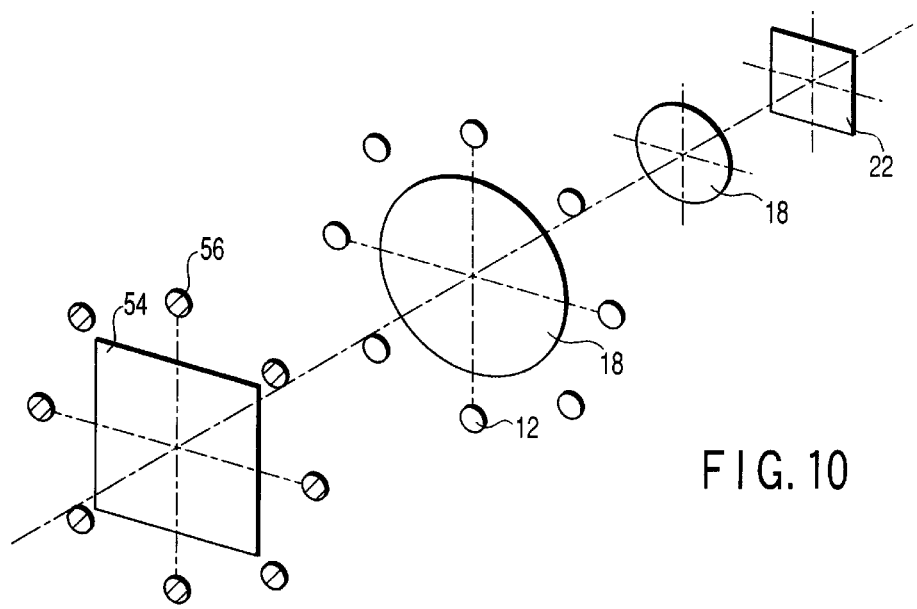
FIG. 10 is a diagram for use in explanation of a configuration of the light sources which is easy to suffer regular reflection.

The intensity of light suffering regular reflection at this time is as indicated by a curve t in FIG. 9 illustrating a plot of intensity versus distribution angle of the rays 46 of light. For reference, when no light diffusing member is used, the light intensity is as indicated by a curve s.

On the other hand, when the light diffusing member is away from the light sources 12 as shown at 16b in FIG. 8, the rays 46 of light from the light source falls on a relatively large region 48b of the light diffusing member 16b and then undergoes diffusion; thus, the intensity of light suffering regular reflection is reduced in comparison with the case of the light diffusing member 16a. That is, the farther away the light diffusing member 16 is from the light sources 12, the more the effect of reducing regular reflection increases. The intensity of light suffering regular reflection when the light diffusing member is away from the light source is indicated by a curve u in FIG. 9.

However, even if an attempt is made to place the light diffusing member further away from the light source as shown at 16c in FIG. 7 so as to obtain more light diffusion, its position is restricted to the position shown at 16c in order not to block light incident on the optical system (most-off-axis reflection light 50 from the imaging area). The light diffusing member 16c will receive direct light from the light sources 12 to the subject surface which suffers regular reflection, failing to make suitable provision for regular reflection.

Thus, as shown in FIG. 7, the light diffusing member 16b is placed in the position where most-off-axis direct light 52 which is emitted from the light source 12 which is closer to the optical axis of the optical system and the most-off-axis reflection light 50 from the imaging area intersect with each other or in its neighborhood. Placing the light diffusing member in such a position allows it to fully display its diffusion capability and does not block light incident on the optical system; thus, this is the most effective against regular reflection. Note that the angle θ shown in FIG. 7 indicates the directivity angle of the light source 12.

Fourth Embodiment

Next, a fourth embodiment of the present invention will be described.

When the optical axis of the optical system is tilted with respect to the subject, regularly reflected light reaches the photosensor 22, adversely affecting the reading of a code pattern. Here, the inclination of the optical axis of the optical system (lenses 18) with respect to the subject 54 when regularly reflected light falls on the photosensor (area sensor) 22 is determined by the distance between a subject 54 which is a plane onto which the photosensor is projected through the optical system and light source images 56 formed through the light sources 12 and indicating light intensity distribution on the subject plane. Among the light source images 56 of the light sources 12 arranged in the form of a ring around the lenses 18, the light sources that are placed along diagonals of the photosensor 22 which is rectangular in imaging area are the most likely to suffer regular reflection because they are the closest to the subject 54.

Figure 11:
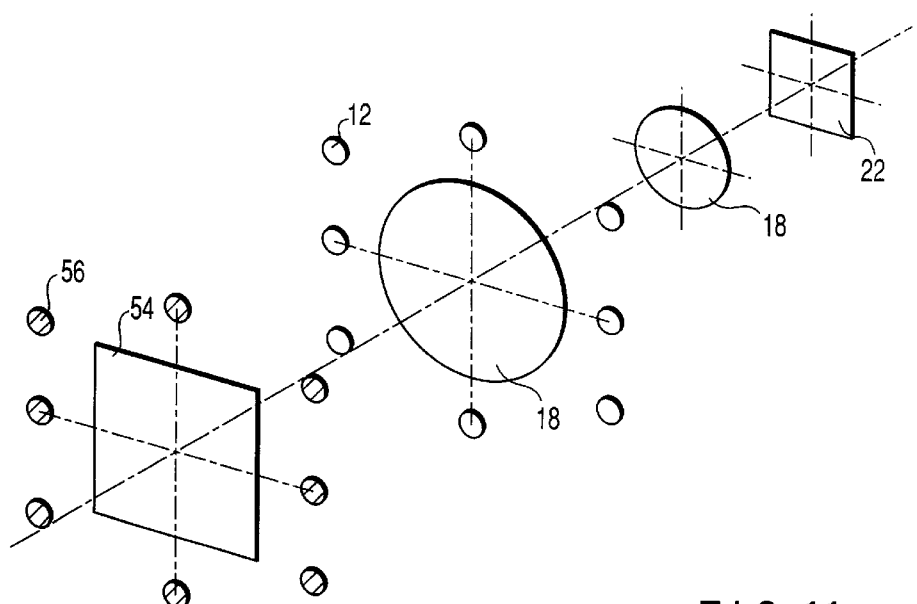
FIG. 11 is a diagram for use in explanation of a configuration of the light sources in an image reader according to a fourth embodiment of the present invention.

In the fourth embodiment, therefore, the light sources 12 are arranged along the shape of the light receiving surface of the photosensor 22 as shown in FIG. 11. Such an arrangement of the light sources allows the distance to the subject to be the same for all of the light source images. All the light sources 12 are thus made equally responsible for regular reflection and the tolerable inclination of the code reader with respect to the subject can be made the same for all directions.

Figure 12:
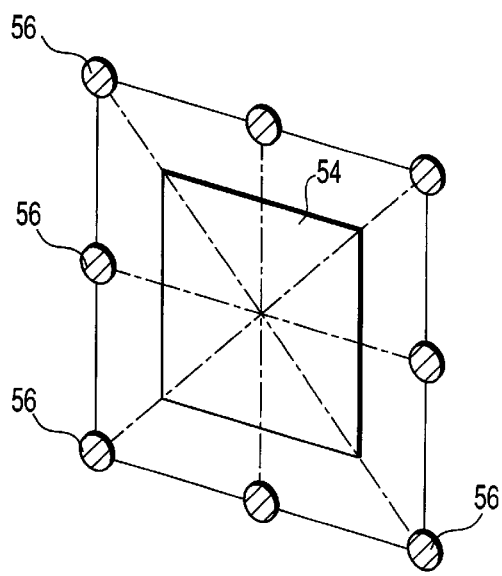
FIG. 12 is a diagram for use in explanation of a configuration of the light sources in a modification of the image reader according to the fourth embodiment of the present invention.

Further, the light sources 12 may be arranged so as not to produce the light source images 56 along the diagonals of the subject 54 as shown in FIG. 12. Namely, the light sources 12 may be arranged along the sides of the subject 54. Such an arrangement of the light sources 12 makes regular reflection more difficult to occur and allows the outer package that accommodates the illumination system to be minimized in size.

Fifth Embodiment

Next, a fifth embodiment of the present invention will be described.

As shown in FIG. 1, the code reader is provided with the light reflecting member 14 which reflects diffused light by the light diffusing member 16 toward the code pattern. This is intended to lighten the burden imposed on the light sources 12 by directing all the rays of light from the light sources to the code pattern. That is, the effective use of light can be achieved.

Figure 13:
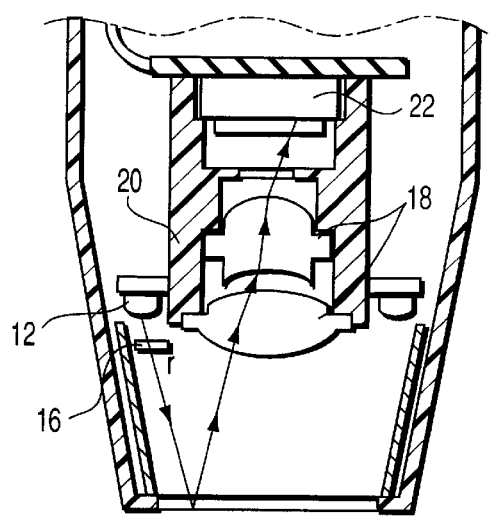
FIG. 13 is a sectional view of the principal part of an image reader according to a fifth embodiment of the present invention.

Here, rays of light that suffer regular reflection are those in the neighborhood of light γ shown in FIG. 13. For this reason, by causing others than rays of light that suffer regular reflection not to pass through the light diffusing member 16, light that suffers no regular reflection is prevented from being attenuated to a larger degree than is necessary in passing through the light diffusing member. This allows the burden on the light sources 12 to be further lightened and the number of the light sources and dissipation current to be reduced.

Figure 14:
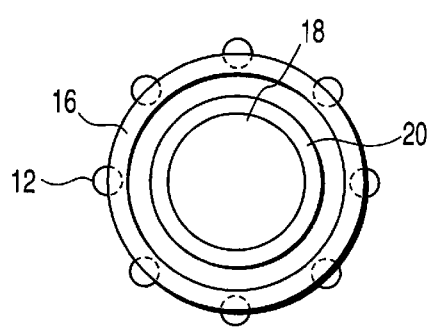
FIG. 14 shows a positional relationship of the light sources and the light diffusion member which is viewed from the end surface of the image reader of the fifth embodiment.

In FIG. 14 there is illustrated a configuration of the light sources 12, the light diffusing member 16, the lenses 18, and the lens barrel 20 in that case. In this configuration, the light sources 12 overlap in their respective portions that emit light suffering regular reflection with the light diffusing member 16. The light diffusing member 16 may be configured such that two or more diffusing members are arranged in the form of a divided ring rather than in the form of a continuous ring shown in FIG. 14.

Sixth Embodiment

Next, a sixth embodiment of the present invention will be described.

The read opening of the code reader is rectangular in shape. This is intended to decrease energy dissipated in the illumination system by making the shape of the opening of the code reader similar to the rectangular imaging area of the photosensor and collecting reflected light from the light reflecting member 14 and diffused light from the light diffusing member 16 onto only the area needing illumination.

Figure 15:
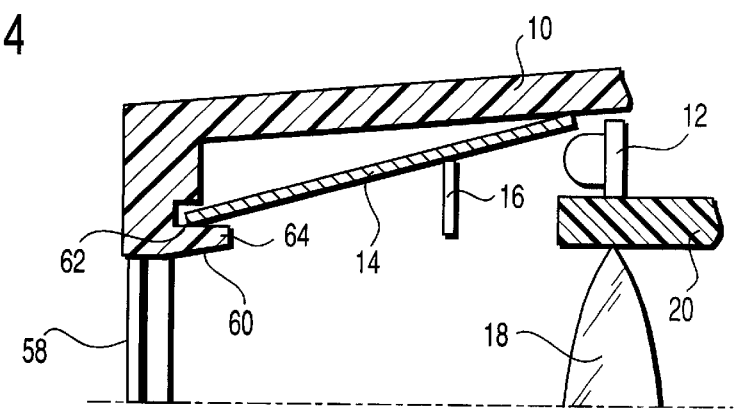
FIG. 15 is a sectional view of the principal part of an image reader according to a sixth embodiment of the present invention.
Figure 16:
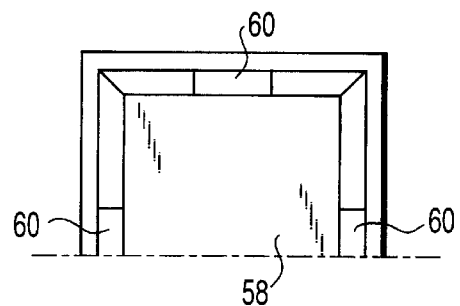
FIG. 16 shows the position of the engagement protrusion of FIG. 15.
Figure 17:
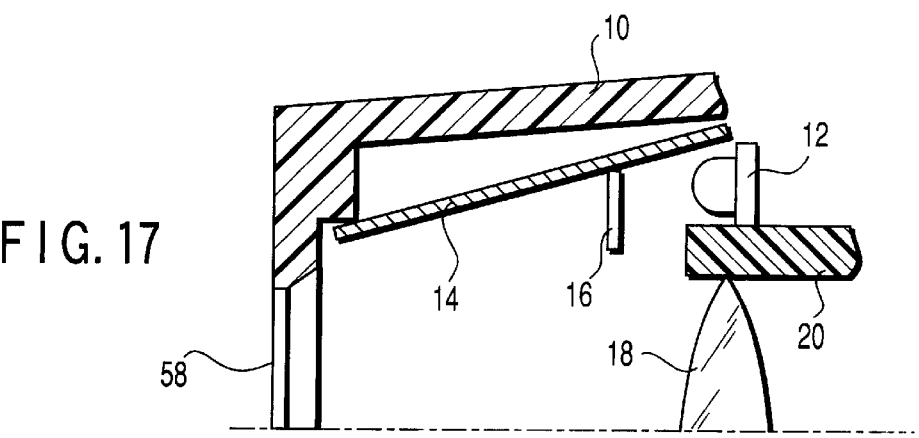
FIG. 17 is a diagram for use in explanation of the reason why the protrusions are not provided at the four corners of the code reader opening.
Figure 19:
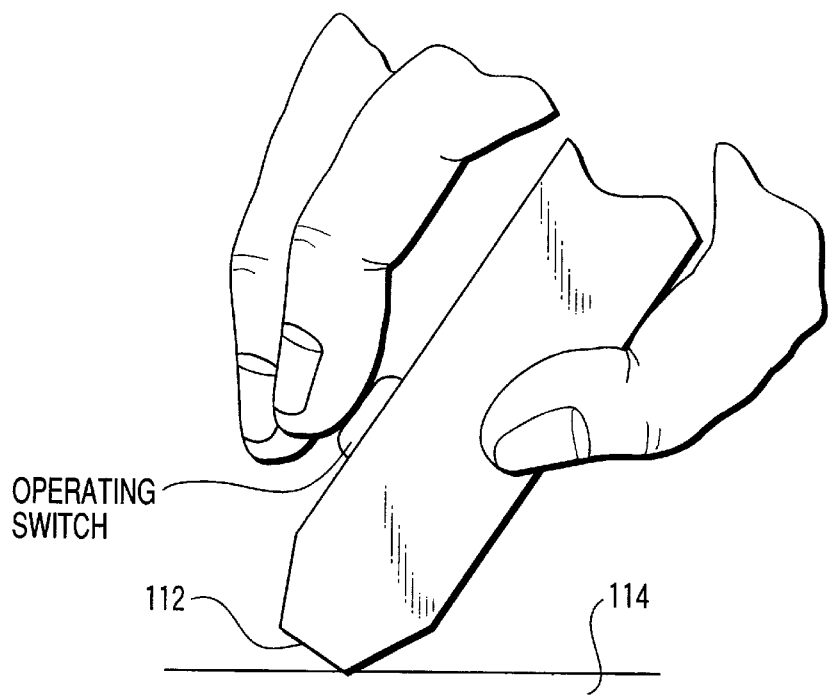
FIG. 19 shows a state in which a prior-art code reader is actually used.

In this embodiment, as shown in FIGS. 15 and 16, there are provided, on the sides of the read opening 58 except at its four corners, engaging protrusions 60 that are directed inward along the optical axis.

These protrusions are intended to position the light reflecting member 14 with respect to the container 10. When the illumination system composed of the light sources 12, the light reflecting member 14, and the light diffusing member 16 is not positioned properly with respect to the read opening 58, the imaging optical system composed of the lenses 18, the lens barrel 20, and the photosensor 22, the read opening 58 and the illumination system may be offset from one another. In such case, irregularities in illumination will occur at the subject surface, affecting the code pattern reading.

The reason why the engaging protrusions 60 are engaged from inside of the light reflecting member 14 is that, if the light reflecting member is made of metal and an edge 62 is exposed, when the user puts a his or her finger into the opening, there arises a possibility that he or she may hurt himself or herself with the edge.

The reason why the protrusions 60 are not provided at the four corners of the rectangular opening 58 is as follows: Although the light reflecting member 14 cannot reflect light in the neighborhood of its end 64 in the center of each side owing to the protrusions, they can be used throughout up to the opening 58 to reflect light at the four corners that are the farthest from the subject center and are easy to suffer shortness of light amount due to marginal darkening of the optical system. As a result, the entire subject can be illuminated uniformly and errors can be prevented in reading the code pattern.

The above-described embodiments of the present invention contain the following inventions:

(1) A code reader which is adapted to be used with a sheet-like recording medium on which data are recorded as an optically readable code pattern and to optically read the code pattern while being manually moved over the code pattern in contact with the recording medium, comprising:

an optical system for forming an optical image of the code pattern recorded on the recording medium onto a photosensor; and the photosensor for converting the optical image formed by the optical system into an electrical signal, wherein a modulation transfer function (MTF) best position on a subject-side of the optical system at a spatial frequency corresponding to the code pattern is set to be present at a given distance from that surface of the code reader which is brought into contact with the recording medium.

According to this configuration, in a code reader which is adapted to read optically a code pattern while being manually moved over the code pattern in contact with a recording medium, the code pattern readable range along the optical axis of the optical system can be extended with a simple configuration. This provides freedom in the user's operating posture for manual scanning.

(2) The code reader according to (1), wherein the MTF best position is set to be present outside the code reader and at a given distance from that end surface of the code reader which faces the recording medium.

This configuration allows the code pattern to be read accurately even if the code reader is floated over or tilted with respect to the recording medium.

(3) The code reader according to (1) or (2), wherein the code pattern consists of an arrangement of a plurality of blocks each with a given area and capable of storing a predetermined amount of data;

each of the blocks comprises at least a data dot pattern consisting of a plurality of data dots, markers placed in a predetermined positional relationship with respect to the data dot pattern for detecting reference positions for reading the data dot pattern, and a block address pattern for identifying the corresponding block;

the photosensor is an area sensor; and the area of the light receiving surface of the area sensor is larger than that image of one block in the code pattern which is formed on the light receiving surface through the optical system at least when the code pattern is present at the surface of the code reader of contact with the recording medium.

According to this configuration, one block can be captured without fail even if the imaging distance to the code pattern varies from time to time during scanning. Thus, the code reader can be optimized for the physical format of a code pattern disclosed in published European application EP 0670555 A1 and large amounts of multimedia information recorded on a medium such as paper can be reproduced stably.

(4) The code reader according to anyone of (1), (2) and (3), wherein the code reader is formed in the shape of a pen, and the code reader surface of contact with the recording medium corresponds to the end surface of the pen.

According to this configuration, the user is allowed to operate the code reader with the usual sense of using writing implements. This permits the user to scan stably the code pattern and recognize easily the surface of the recording medium.

(5) The code reader according to anyone of (1), (2) and (3), further comprising a diaphragm section having a fixed diaphragm value.

According to this configuration, even with the fixed diaphragm, that is, even if an approach to adjust the depth of focus by changing adaptively the diaphragm value according to floating or tilting of the code reader is not adopted, the readable range can be made wide in the direction of the optical axis. That is, it becomes possible to compensate for the floating or tilting of the code reader.

(6) A code reader which is adapted to be used with a sheet-like recording medium on which data are recorded as an optically readable code pattern and to optically read the code pattern by illuminating the code pattern and allowing an area sensor to receive reflected light from the code pattern through an optical system, comprising:

a plurality of light sources for emitting illumination light;

a light diffusing member for diffusing the illumination light emitted by the light sources; and an optical system for imaging the code pattern illuminated by light diffused by the light diffusing member onto an area sensor, wherein the plurality of light sources is arranged in the form of a ring around a lens barrel which holds the optical system, and the light diffusing member is formed in the shape of a ring and positioned near or in a place where the most-off-axis direct light from the light sources which is closer to the optical axis of the optical system and the most-off-axis reflected light from the imaging area of the code pattern intersect with each other.

The positioning of the light diffusing member in this way permits regular reflection to be prevented most effectively.

(7) The code reader according to (6), wherein the plurality of light sources is arranged along the shape of the light receiving surface of the area sensor.

By arranging the plurality of light sources along the shape of the light receiving surface of the area sensor, tolerable angles of the code reader with respect to the code pattern surface can be made constant in all directions. Moreover, the light sources can be arranged with compactness to decrease the code reader in size.

(8) The code reader according to (7), wherein the plurality of light sources is arranged along the sides of the light receiving surface of a rectangular shape of the area sensor except its four corners.

This configuration permits the light sources to be arranged with compactness and the code reader to be decreased in size.

(9) The code reader according to (6), further comprising a light reflecting member for reflecting diffused light from the light diffusing member onto the code pattern, and wherein the ring-shaped light diffusing member is set such that part of the illumination light from each of the light sources directly reaches the light reflecting member without falling on the ring-shaped light diffusing member.

By setting the outer diameter of the ring-shaped light diffusing member so as to allow part of the illumination light from each of the light sources to directly reach the light reflecting member without falling on the ring-shaped light diffusing member, regular reflection is prevented and light that suffers no regular reflection is not attenuated. Thus, light can be used effectively to reduce the number of light sources used and dissipation current.

(10) The code reader according to claim (6), wherein the code reader is arranged to read the code pattern recorded on the recording medium by manually scanning it.

That is, since regular reflection can be prevented, the user is given freedom in the operating posture for manual scanning.

(11) A code reader which is adapted to be used with a sheet-like recording medium on which data are recorded as an optically readable code pattern and to optically read the code pattern by illuminating the code pattern and allowing an area sensor to receive reflected light from the code pattern through an optical system, comprising:

a plurality of light sources, arranged around a barrel for holding the optical system, for emitting illumination light;

a light diffusing member for diffusing the illumination light emitted from each of the light sources;

a light reflecting member for reflecting diffused light from the light diffusing member onto the code pattern present at a read opening; and an area sensor having a rectangular light receiving surface for receiving reflected light from the code pattern illuminated by the reflected light from the light reflecting member and the diffused light from the light diffusing member, wherein the shape of the read opening is formed into a rectangle substantially equal to the light receiving surface of the area sensor, engagement protrusions provided on the sides of the read opening except its corners so as to extend inward along the optical axis of the optical axis, and the light reflecting member is mounted on the side of the read opening using the engagement protrusions.

The provision of such engagement protrusions allows the light reflecting member to be positioned with respect to the outer package that forms the read opening, reducing variations in assembly. Further, since the engagement protrusions are engaged from the inside of the light reflecting member, the edge of the light reflecting member which is made of metal is not exposed. Thus, even if the user puts his or her finger into the read opening, he or she will not hurt himself or herself with the edge of the light reflecting member. Moreover, a reduction in the amount of light is prevented at the margin.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A code reader adapted to optically read a code pattern recorded on a recording medium while being manually moved over the code pattern in contact with the recording medium, comprising:

a photosensor; and an optical system which forms an optical image of the code pattern onto the photosensor;

wherein said photosensor converts the optical image formed by said optical system into an electrical signal, wherein a modulation transfer function (MTF) best position on a subject-side of said optical system at a spatial frequency corresponding to the code pattern is set to be present at a given distance from a surface of the code reader which is brought into contact with the recording medium, in a direction away from said code reader, thereby widening a readable range of the code reader in a forward/backward direction on an optical axis with respect to the modulation transfer function (MTF) best position, the readable range being a range in which a contrast value of the optical image of the code pattern formed onto the photosensor is equal to or higher than a predetermined value; and wherein the code reader is enabled to accurately read the code pattern even if the surface of the code reader is inclined with respect to the recording medium or separated from the recording medium while the code pattern is being manually moved over an entire length of the recording medium, and a distance between the code reader and the recording medium is changed.

2. The code reader according to claim 1, wherein:

the code pattern comprises an arrangement of a plurality of blocks each with a given area and capable of storing a predetermined amount of data;

each of the blocks comprises at least a data dot pattern comprising a plurality of data dots, markers placed in a predetermined positional relationship with respect to the data dot pattern for detecting reference positions for reading the data dot pattern, and a block address pattern for identifying each block;

said photosensor comprises an area sensor; and an area of a light receiving surface of said area sensor is larger than an image of one block in the code pattern which is formed on the light receiving surface through said optical system at least when the code pattern is present at the surface of the code reader which contacts the recording medium.

3. The code reader according to claim 2, wherein:

the code reader is formed in the shape of a pen, and the surface of the code reader which contacts the recording medium corresponds to an end surface of the pen.

4. The code reader according to claim 3, further comprising a diaphragm section having a fixed diaphragm value.

5. The code reader according to claim 1, wherein:

the code reader is formed in the shape of a pen, and the surface of the code reader which contacts the recording medium corresponds to an end surface of the pen.

6. The code reader according to claim 1, further comprising a diaphragm section having a fixed diaphragm value.

* * * * *